(12) United States Patent
Kimura

(10) Patent No.: US 9,864,552 B2
(45) Date of Patent: Jan. 9, 2018

(54) COMMUNICATION APPARATUS, CONTROL METHOD OF COMMUNICATION APPARATUS, AND STORAGE MEDIUM

(71) Applicant: CANON KABUSHIKI KAISHA, Tokyo (JP)

(72) Inventor: Tomohiro Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/184,584

(22) Filed: Feb. 19, 2014

(65) Prior Publication Data

US 2014/0240768 A1 Aug. 28, 2014

(30) Foreign Application Priority Data

Feb. 22, 2013 (JP) .................................. 2013-033425

(51) Int. Cl.
*G06F 3/12* (2006.01)
*G06K 15/02* (2006.01)
*H04W 4/00* (2009.01)
*H04W 4/02* (2009.01)

(52) U.S. Cl.
CPC .......... *G06F 3/1204* (2013.01); *G06F 3/1226* (2013.01); *G06F 3/1236* (2013.01); *G06F 3/1292* (2013.01); *H04W 4/023* (2013.01); *H04W 4/008* (2013.01)

(58) Field of Classification Search
CPC .............................................. H04N 2201/006
See application file for complete search history.

(56) References Cited

U.S. PATENT DOCUMENTS

| | | | | |
|---|---|---|---|---|
| 2003/0193687 A1* | 10/2003 | Parry | ............... | G06F 3/1204 358/1.15 |
| 2004/0160623 A1* | 8/2004 | Strittmatter | ......... | H04M 1/7253 358/1.15 |
| 2004/0187022 A1* | 9/2004 | Asada | .................. | H04L 63/105 726/14 |
| 2005/0144161 A1* | 6/2005 | Hirota | .................. | G06F 9/4443 |
| 2005/0174609 A1* | 8/2005 | Thurlow | ....................... | 358/425 |
| 2005/0190395 A1* | 9/2005 | Aritomi | ............... | G06F 3/1203 358/1.13 |
| 2006/0206592 A1* | 9/2006 | Fujii et al. | .................... | 709/220 |
| 2007/0030516 A1* | 2/2007 | Tsuji et al. | ................... | 358/1.15 |
| 2007/0086052 A1* | 4/2007 | Furuya | .................... | H04L 67/16 358/1.15 |
| 2007/0233834 A1* | 10/2007 | Hattori et al. | ................ | 709/223 |

(Continued)

FOREIGN PATENT DOCUMENTS

| | | |
|---|---|---|
| CN | 101833430 A | 9/2010 |
| CN | 102572584 A | 7/2012 |

(Continued)

OTHER PUBLICATIONS http://www.popularmechanics.com/technology/how-to/tips/how-does-wi-fi-direct-work-12203369.
http://www.digikey.com/us/en/techzone/wireless/resources/articles/Wi-Fi-Direct-adds-Peer-to-Peer-Capabilities.html.

*Primary Examiner* — Beniyam Menberu
(74) *Attorney, Agent, or Firm* — Canon U.S.A., Inc. IP Division

(57) ABSTRACT

When a service of interest is specified, a communication apparatus searches other communication apparatuses capable of providing the specified service and establishes a wireless communication with the specified communication apparatus.

9 Claims, 13 Drawing Sheets

(56) References Cited

U.S. PATENT DOCUMENTS

| | | | |
|---|---|---|---|
| 2008/0043110 A1* | 2/2008 | Aizawa | H04L 12/2805 348/211.2 |
| 2008/0231886 A1* | 9/2008 | Wehner et al. | 358/1.15 |
| 2008/0261640 A1* | 10/2008 | Yoshida | 455/517 |
| 2009/0052344 A1* | 2/2009 | Fujii | H04N 1/00278 370/254 |
| 2010/0190440 A1* | 7/2010 | Kim | 455/41.2 |
| 2010/0201996 A1* | 8/2010 | Chang | G06F 3/1245 358/1.2 |
| 2010/0322213 A1* | 12/2010 | Liu | H04L 67/16 370/338 |
| 2011/0002009 A1* | 1/2011 | Ohashi | G01S 5/06 358/1.15 |
| 2011/0063663 A1* | 3/2011 | Kim | G06F 3/1206 358/1.15 |
| 2011/0122437 A1* | 5/2011 | Shimohira | 358/1.15 |
| 2011/0149816 A1* | 6/2011 | Saito et al. | 370/310 |
| 2012/0134349 A1* | 5/2012 | Jung | H04W 8/005 370/338 |
| 2012/0201245 A1* | 8/2012 | Ogata | H04L 12/1886 370/390 |
| 2012/0265913 A1* | 10/2012 | Suumaki | H04W 4/008 710/303 |
| 2012/0296986 A1* | 11/2012 | Hassan | H04W 12/06 709/206 |
| 2013/0045678 A1 | 2/2013 | Lee | |
| 2013/0100486 A1* | 4/2013 | Mccoog et al. | 358/1.15 |
| 2013/0137375 A1* | 5/2013 | Wilson | H04M 1/7253 455/41.2 |
| 2013/0141755 A1* | 6/2013 | Miller et al. | 358/1.15 |
| 2013/0159537 A1* | 6/2013 | Kwon et al. | 709/227 |
| 2013/0170482 A1* | 7/2013 | Jung | H04W 8/005 370/338 |
| 2013/0195093 A1* | 8/2013 | Shimada | H04W 76/023 370/338 |
| 2013/0201525 A1* | 8/2013 | Niwa | G06F 3/1236 358/1.15 |
| 2013/0232253 A1* | 9/2013 | Elhaddad | H04W 8/005 709/224 |
| 2013/0260674 A1* | 10/2013 | Shimada | H04W 76/02 455/39 |
| 2014/0094124 A1* | 4/2014 | Dave | H04W 8/005 455/41.2 |
| 2014/0201415 A1* | 7/2014 | Huang | G06F 13/00 710/303 |
| 2014/0351444 A1* | 11/2014 | Qi | H04L 67/16 709/227 |

FOREIGN PATENT DOCUMENTS

| | | |
|---|---|---|
| CN | 102629947 A | 8/2012 |
| CN | 102833876 A | 12/2012 |
| JP | 2002051372 A | 2/2002 |
| JP | 2009538048 A | 10/2009 |
| JP | 2012-199884 A | 10/2012 |

* cited by examiner

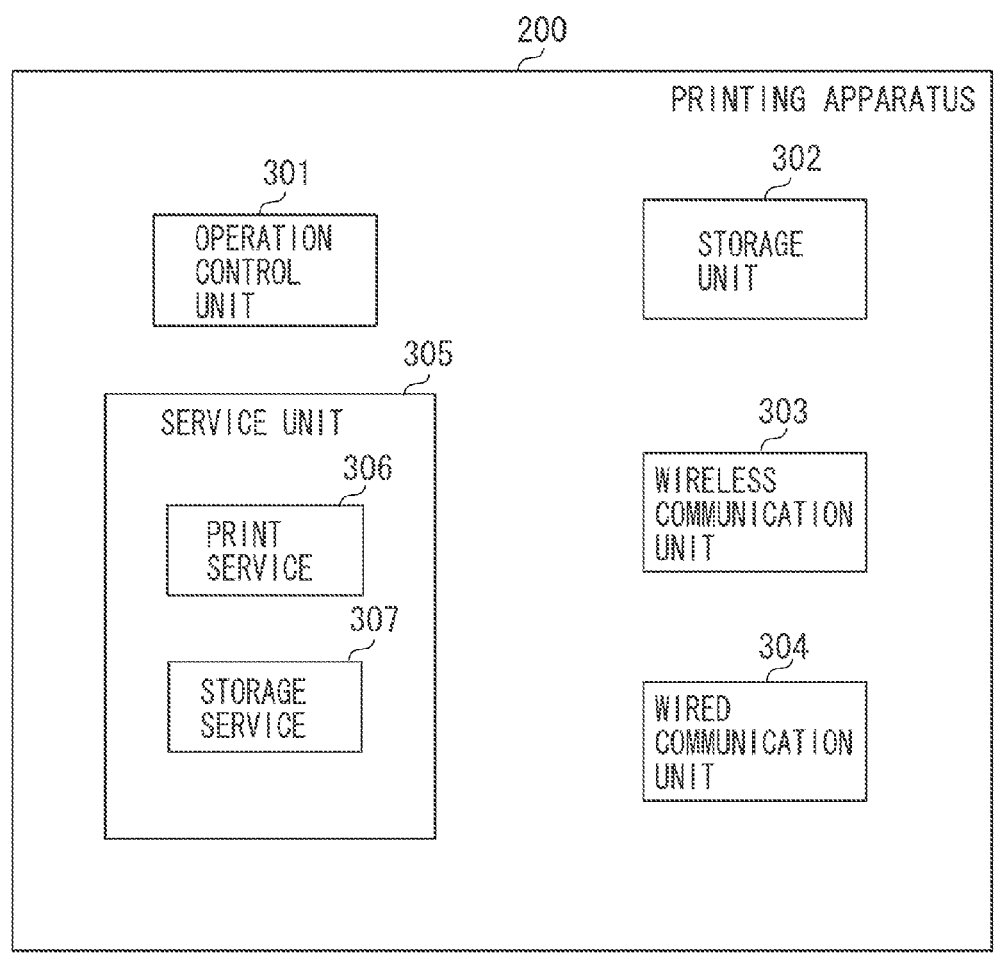

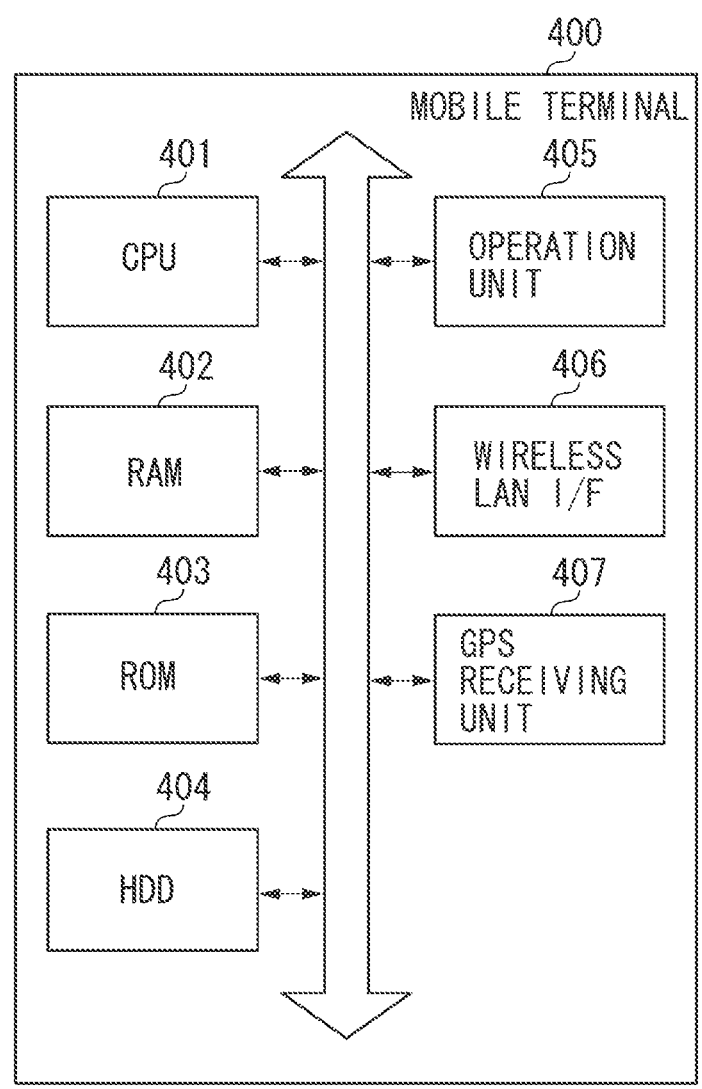

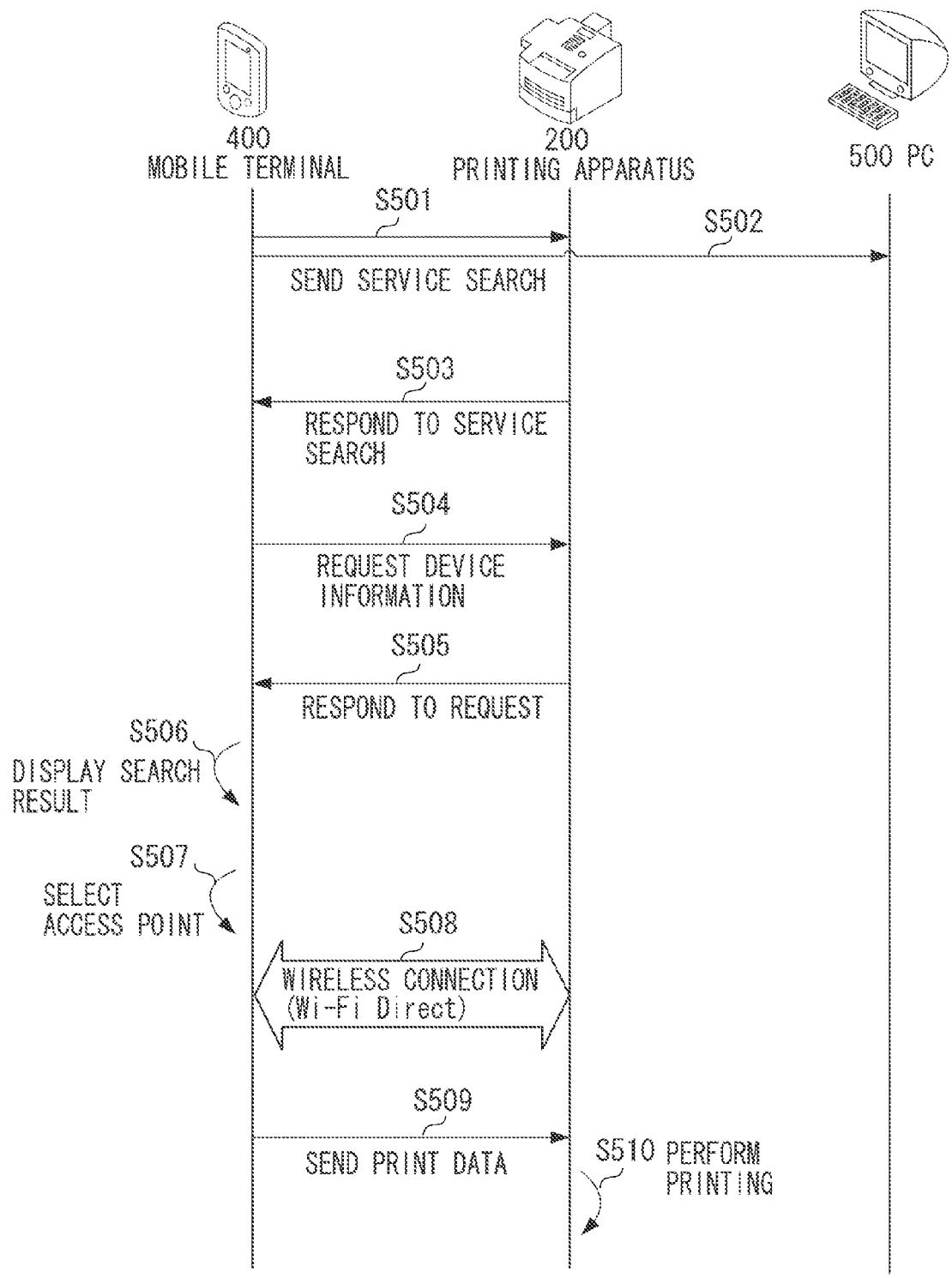

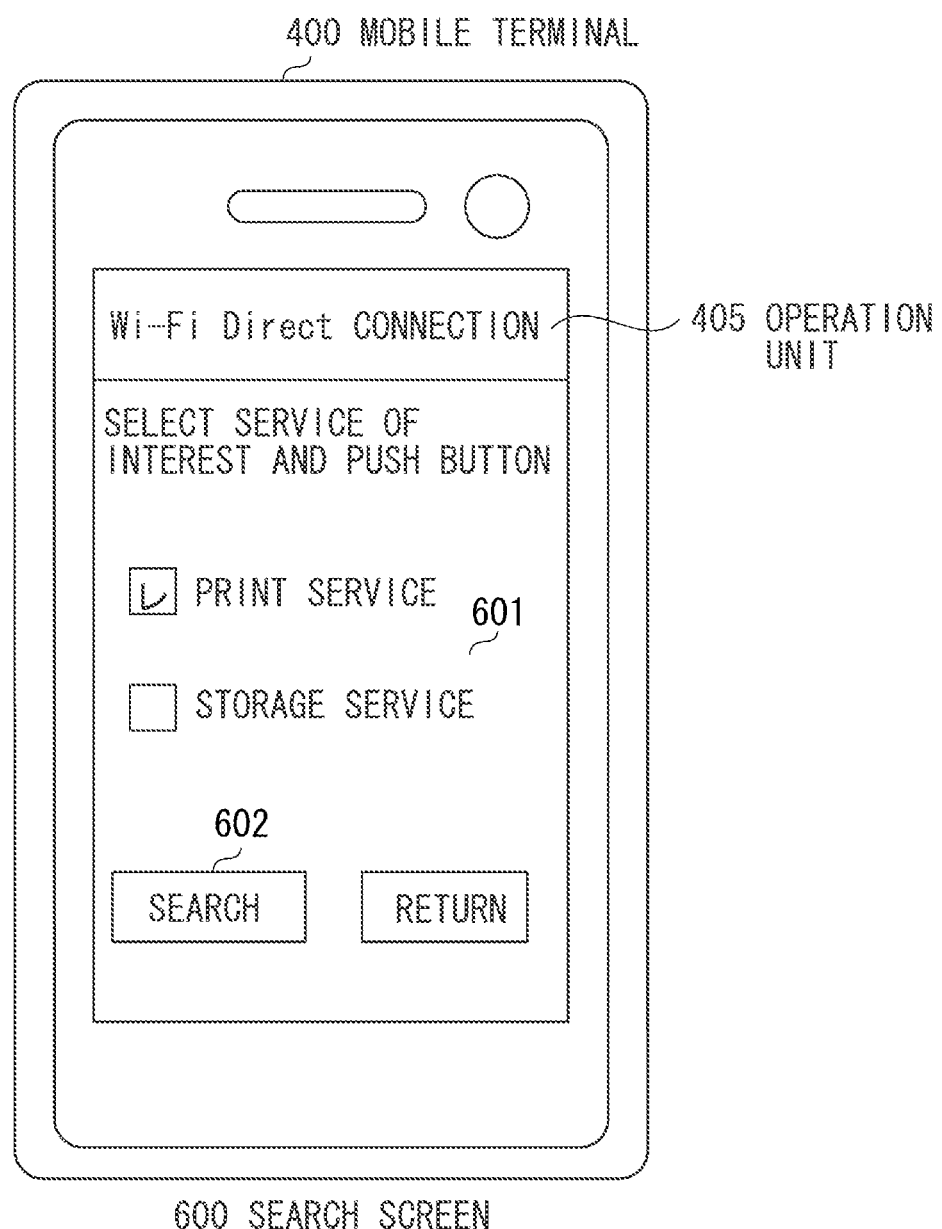

FIG. 7

| | REGISTRATION SCREEN | | | | | | |
|---|---|---|---|---|---|---|---|
| 701— | DEVICE NAME: | Printer-001 | | | | | |
| 702— | SETUP LOCATION: | C-2 | | | | | |
| 703— | LATITUDE: | N ▼ | 43 ° | 0 ' | 00 " | | |
| | LONGITUDE: | E ▼ | 128 ° | 0 ' | 00 " | | |
| | 704— REGISTER   RETURN | | | | | | |

700 REGISTER SCREEN

FIG. 8

| BASIC INFORMATION 801 | | DEVICE NAME |
| --- | --- | --- |
| | | MAC ADDRESS |
| | | LOCATION INFORMATION |
| 802 CAPABILITY INFORMATION | PRINT SERVICE | PRINT SPEED |
| | | AVAILABILITY OF COLOR PRINT |
| | STORAGE SERVICE | MAXIMUM CAPACITY |
| | | FREE CAPACITY |

800 DEVICE INFORMATION

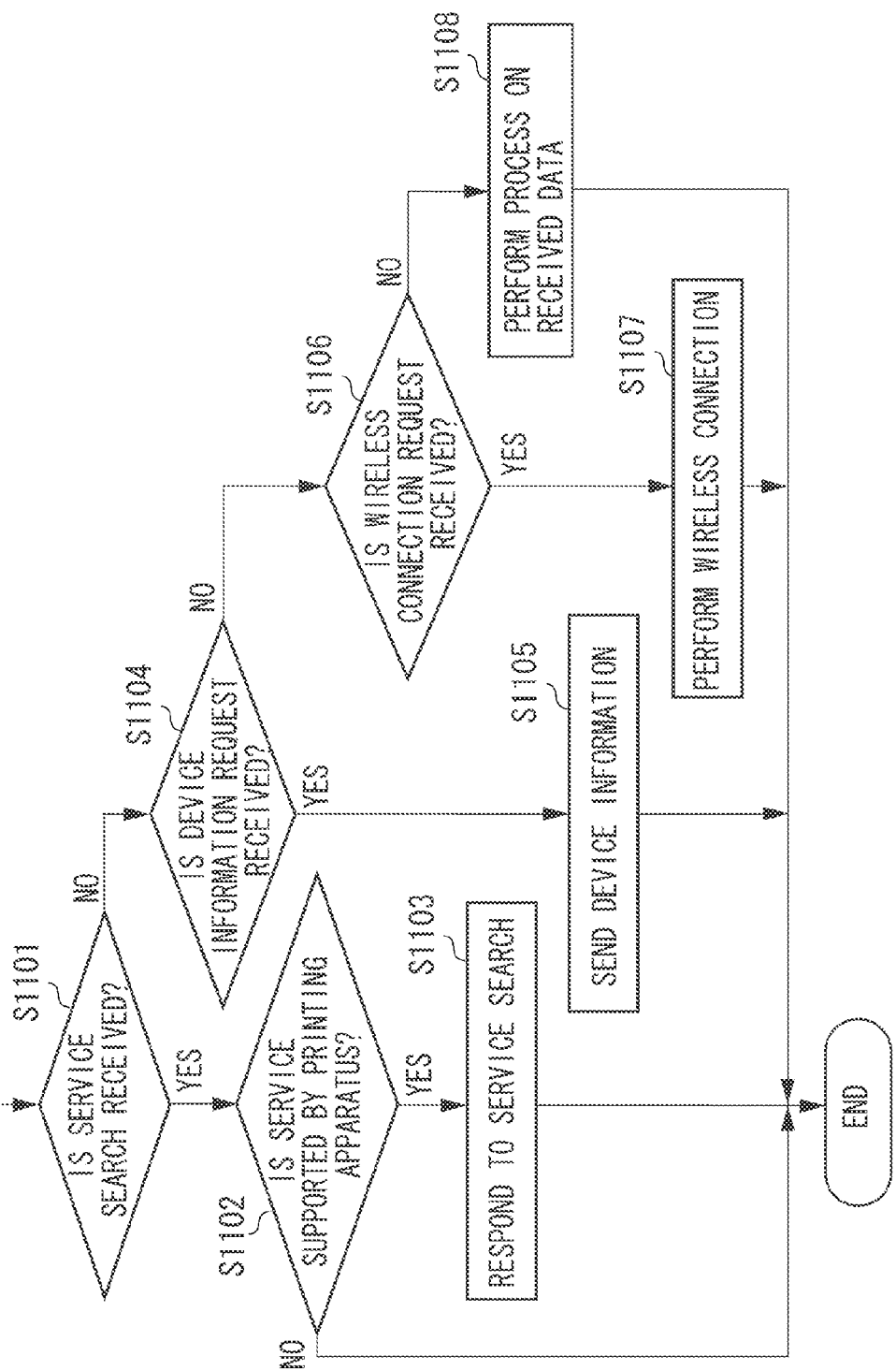

COMMUNICATION APPARATUS, CONTROL METHOD OF COMMUNICATION APPARATUS, AND STORAGE MEDIUM

BACKGROUND

Field

Aspects of the present invention generally relate to a communication apparatus, a control method of the communication apparatus, and a storage medium.

Description of the Related Art

Wi-Fi Alliance has established a Wi-Fi Direct® standard. Wi-Fi Direct specifies a protocol for determining whether a communication apparatus, such as a printing apparatus or a personal computer (PC), operates as an access point or a client. Executing the protocol automatically determines a communication apparatus to be served as an access point, and a communication apparatus to be served as a client. Using Wi-Fi Direct allows communication apparatuses to directly perform wireless communication with each other without the need of separately preparing any access point.

FIG. 1 is a diagram illustrating a processing sequence of Wi-Fi Direct. A printing apparatus and a mobile terminal are exemplary information processing apparatuses that support Wi-Fi Direct, respectively.

In step S101, first, the printing apparatus and the mobile terminal perform a device search to specify their respective communication partners. In step S102, when they have specified their respective communication partners by the device search, they determine which one serves as an access point (GroupOwner) and which one serves as a client (Client). Hereinafter, such processing in step S102 is referred to as role determination. FIG. 1 illustrates an exemplary result of the role determination in step S102 in which the printing apparatus serves as GroupOwner and the mobile terminal serves as Client.

In step S103, subsequently, Wi-Fi Protected Setup (WPS) established by Wi-Fi Alliance is used to cause the printer apparatus and the mobile terminal to share parameters for making the printer apparatus (GroupOwner) accessible to the mobile terminal (Client). Then, in step S104, the printer apparatus and the mobile terminal are securely connected to each other. Until the processing in step S104 is completed, they communicate with each other as a data-link layer communication of an Open Systems Interconnection (OSI) reference model.

In step S105, when completing the secure connection, the printer apparatus and the mobile terminal perform addressing for internet protocol (IP) communication therebetween. In this case, the printing apparatus (GroupOwner) serves as a Dynamic Host Configuration Protocol (DHCP) server and provides the mobile terminal (Client) with an IP address. The processing in step S105 allows the printer apparatus and the mobile terminal to communicate with each other at a layer higher than a network layer of the OSI reference model.

By performing the above processing, the printer apparatus and the mobile terminal establish a wireless communication between them. Then, using the wireless communication makes the printer apparatus and the mobile terminal directly communicable with each other without preparing any additional access point. Japanese Patent Application Laid-Open No. 2012-199884 discusses transmission/reception of audio data or photography data using Wi-Fi Direct.

A communication apparatus can easily establish wireless communications with an external apparatus by Wi-Fi Direct. Then, the communication apparatus can utilize various services (for example, print service and storage service) using the wireless communication established by Wi-Fi Direct. However, if the external apparatus does not provide a user of the communication apparatus with any desired service, the communication apparatus has to search for a connection partner again. From the user's viewpoint, therefore, the user may have to repeat the procedures illustrated in FIG. 1 until he or she can utilize the desired service, and the repetition makes the user spend more time and labor.

SUMMARY

Aspects of the present invention are generally directed to a communication apparatus that searches an apparatus capable of providing a service requested by a user and establishes a wireless communication with the apparatus.

According to an aspect of the present invention, a communication apparatus capable of performing wireless communication includes an accepting unit configured to accept an instruction for specifying a service to be used by the communication apparatus from among a plurality of services provided by an external apparatus, a first transmitting unit configured to transmit a search request for searching an external apparatus capable of providing the service specified by the accepting unit, a second transmitting unit configured to transmit an acquisition request for acquiring device information of the external apparatus to the external apparatus that has responded to the search request, a display unit configured to display the external apparatus capable of providing the specified service based on the device information acquired in response to the acquisition request, and a processing unit configured to perform a connection process for establishing a wireless communication with a specific external apparatus from among external apparatuses displayed by the display unit.

Further features of the present disclosure will become apparent from the following description of exemplary embodiments with reference to the attached drawings.

BRIEF DESCRIPTION OF THE DRAWINGS

FIG. 3 is a diagram illustrating a software configuration of the printing apparatus.

FIG. 4 is a diagram illustrating a hardware configuration of a mobile terminal.

FIG. 5 is a sequence diagram illustrating a flow of entire processing.

FIGS. 6A, 6B, and 6C are diagrams each illustrating a search screen displayed on the mobile terminal.

FIG. 7 is a diagram illustrating a screen for registering location information of the printing apparatus.

FIG. 8 is a diagram illustrating information stored in the printing apparatus.

FIG. 11 is a diagram illustrating a flowchart illustrating processing executed by the printing apparatus.

DESCRIPTION OF THE EMBODIMENTS

Various exemplary embodiments, features, and aspects will be described in detail below with reference to the drawings. Exemplary embodiments described below are not limiting, and any combination of the features described in the exemplary embodiments is not always essential for the described solution(s).

Figure 1:
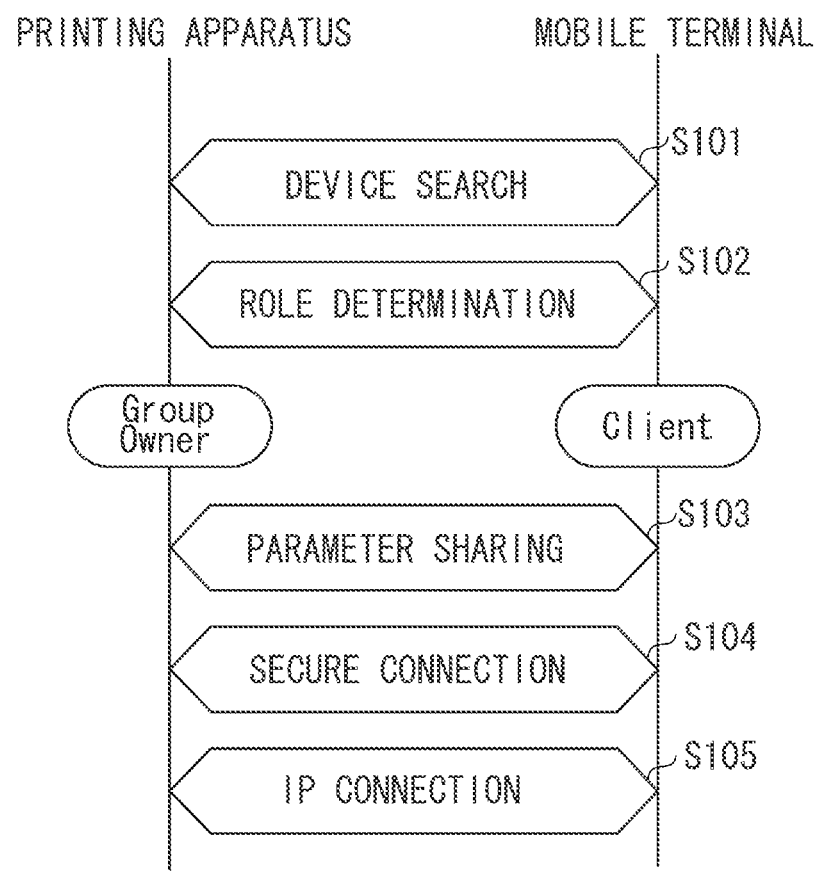
FIG. 1 is a diagram illustrating a processing sequence of Wi-Fi Direct.
Figure 2:
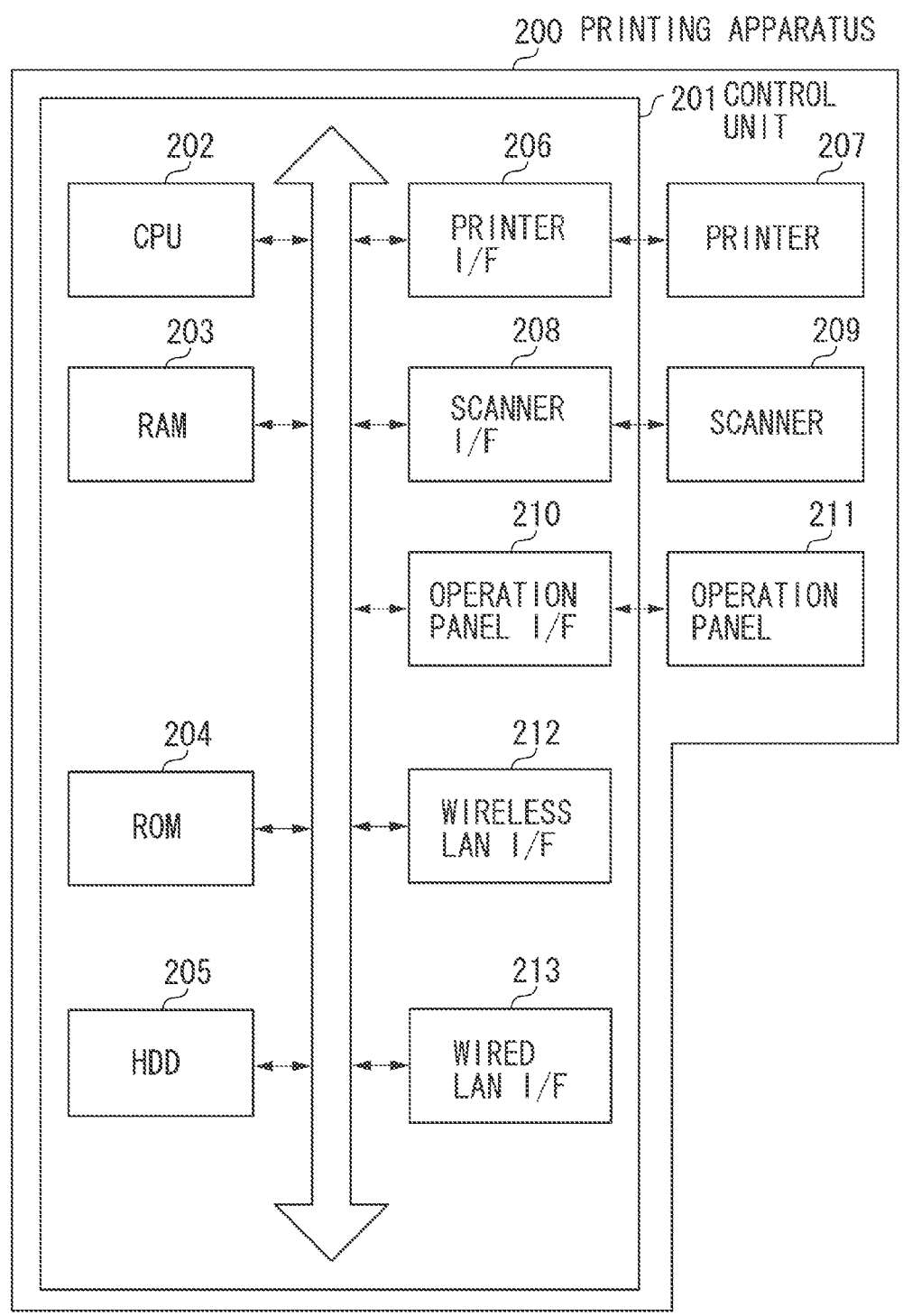
FIG. 2 is a diagram illustrating a hardware configuration of a printing apparatus.

FIG. 2 is a diagram illustrating a hardware configuration of a printing apparatus 200. The printing apparatus 200 is an exemplary communication apparatus capable of performing wireless communication.

A control unit 201 including a central processing unit (CPU) 202 controls an operation of the entire printing apparatus 200. The CPU 202 reads out a control program stored in a read only memory (ROM) 204 to execute various kinds of control such as communication control. A random access memory (RAM) 203 serves as a temporary area of a main memory, a work area, or the like of the CPU 202. A hard disk drive (HDD) 205 stores various kinds of data and programs or various kinds of information tables. The HDD 205 can also store image data transmitted from an external apparatus.

A printer interface (I/F) 206 connects a printer 207 (printer engine) to the control unit 201. The printer 207 performs a printing process on a sheet fed from a sheet cassette (not shown) based on print data input through the printer I/F 206.

A scanner interface (I/F) 208 connects a scanner 209 to the control unit 201. The scanner 209 reads a document placed on its document positioning plate (not shown), and then generates image data. The image data generated by the scanner 209 may be printed by the printer 207, stored in the HDD 205, or transmitted to the external apparatus through a wireless Local Area Network Interface (wireless LAN I/F) 212 or a wired LAN I/F 213.

An operation panel I/F 210 connects an operation panel 211 to the control unit 201. The operation panel 211 includes a liquid crystal display unit having a touch panel function, a key board, and other various function keys. The operation panel 211 allows a user to confirm an image displayed thereon and to use the touch panel to input various instructions into the printing apparatus 200.

The wireless LAN I/F 212 wirelessly communicates with the external apparatus such as a mobile terminal or a personal computer (PC). The wireless communication allows the printing apparatus 200 to receive print data from the external apparatus. Then, the printer 207 performs a printing process based on the received print data. The image data generated by the scanner 209 can also be transmitted to the external apparatus through the wireless LAN I/F 212.

The wired LAN I/F 213 is connected to a LAN cable (not shown) to communicate to an external apparatus (not shown).

The printing apparatus 200 is configured so that one CPU 202 uses one memory (RAM 203) to perform each operation represented in a flowchart described below. Alternatively, however, the printing apparatus 200 may be configured in a different way. For example, the printing apparatus 200 may be configured so that a plurality of CPUs may cooperate with a plurality of memories to perform each operation represented in the flowchart.

FIG. 3 is a diagram illustrating a software configuration of the printing apparatus 200. The CPU 202 executes a control program stored in the ROM 204 or HDD 205 to implement each functional unit illustrated in FIG. 3.

An operation control unit 301 controls the operation panel 211. Specifically, for example, the operation control unit 301 makes the operation panel 211 display an operation screen, and receives an instruction input from the user through the displayed operation screen. Furthermore, the operation control unit 301 notifies another functional unit of the received user's instruction, and makes the operation panel 211 update the operation screen to be displayed in response to the received user's instruction.

In response to an instruction from another functional unit, a storage unit 302 stores specified data on the RAM 203 or HDD 205, or reads out data stored therein.

A wireless communication unit 303 controls wireless communication performed by the wireless LAN I/F 212. A wired communication unit 304 controls communication performed by the wired LAN I/F 213.

A service unit 305 provides a service to the external apparatus such as a mobile terminal or PC. In the present exemplary embodiment, the service unit 305 includes a print service 306 and a storage service 307.

The print service 306 provides a print service for the external apparatus. Specifically, the print service 306 inputs print data received from the external apparatus into the printer 207, and then makes the printer 207 perform printing processing based on the print data.

The storage service 307 provides a storage service for the external apparatus. Specifically, the storage service 307 makes a memory such as the HDD 205 store an electronic file such as image data received from the external apparatus.

The present exemplary embodiment describes both the print service 306 and the storage service 307 as exemplary services provided by the service unit 305. Note that the service unit 305 may provide other services.

FIG. 4 is a diagram illustrating a hardware configuration of a mobile terminal 400. Like the printing apparatus 200, the mobile terminal 400 is also an exemplary communication apparatus capable of performing wireless communication. Examples of the mobile terminal 400 include smartphones, cell phones, tablets, and digital cameras.

A CPU 401 reads out a control program stored in a ROM 403 to control an operation of the entire mobile terminal 400. A RAM 402 serves as a temporary area of a main memory, a work area, or the like of the CPU 401. A HDD 404 stores various kinds of data and programs or various kinds of information tables.

An operation unit 405 includes a liquid crystal display unit having a touch panel function or hard keys. The operation unit 405 allows the user to check a screen displayed on the operation unit 405 and to input various instructions into the printing apparatus 200 through the touch panel.

A wireless LAN I/F 406 wirelessly communicates with an external apparatus such as the printing apparatus 200. For example, the wireless LAN I/F 406 can transmit image data, which has been stored in a memory such as the HDD 404, as print data to the printing apparatus 200.

A Global Positioning System (GPS) receiving unit 407 receives a signal from a GPS satellite. The signal allows the CPU 401 to specify the position of the mobile terminal 400.

The mobile terminal 400 is configured so that one CPU 401 uses one memory (RAM 402) to perform each operation represented in a flowchart described below. Alternatively, however, the mobile terminal 400 may be configured in a different way. For example, the mobile terminal 400 may be configured so that a plurality of CPUs may cooperate with a plurality of memories to perform each operation represented in the flowchart.

Referring now to a sequence diagram, FIG. 5, the flow of processing in the entire communication system of the present exemplary embodiment will be described. FIG. 5 illustrates an exemplary communication system including the mobile terminal 400, the printing apparatus 200, and a PC 500. The printing apparatus 200 includes a print service and a storage service, while the PC 500 includes only a storage service.

The user of the mobile terminal 400 specifies a service of interest among a plurality of services provided by the communication apparatuses such as the printing apparatus 200 and the PC 500. In steps S501 and S502, the mobile terminal 400 transmits a service search (search request) for searching a communication apparatus capable of providing the user-specified service. The service search is transmitted in broadcast.

A search screen 600 illustrated in FIG. 6A is a screen displayed on the operation unit 405 of the mobile terminal 400. The search screen 600 specifies a service that the user intends to use. In the present embodiment, a list of items 601 represents two different services, a print service and a storage service, to allow the user to specify the service of interest. The user may specify one or both of the print service and the storage service. In steps S501 and S502, if the user presses a button 602 after specifying the service from the list of items 601, the service search is transmitted.

The communication apparatus (printing apparatus 200 or PC 500) that has received the service search determines whether the apparatus can provide the user with the service specified by the service search. Here, the service search transmitted in steps S501 and S502 specifies the print service.

In step S503, the printing apparatus 200 responds to the service search because the printing apparatus 200 can provide the print service. The response includes at least a media control access (MAC) address of the printing apparatus 200. On the other hand, the PC 500 does not respond because the PC 500 cannot provide the print service.

In step S504, the mobile terminal 400, which has received the response to the service search, makes a request for device information to the printing apparatus 200 that has responded to the service search. In step S504, the mobile terminal 400 uses the MAC address in the response received in step S503 to transmit in unicast an acquisition request for acquiring the device information to the printing apparatus 200. Since the PC 500 does not respond to the service search, the mobile terminal 400 does not transmit the acquisition request for device information to the PC 500. Here, in FIG. 5, the request for device information is transmitted to the printing apparatus 200. Alternatively, if there is a plurality of communication apparatuses that have responded to the service search, the acquisition request for device information is transmitted to each of these apparatuses.

In step S505, the printing apparatus 200, which has received the acquisition request for device information, makes a response to the acquisition request for device information. In the present exemplary embodiment, in step S505, the printing apparatus 200 transmits at least two kinds of information thereof, which serve as device information of the printing apparatus 200, as a response to the mobile terminal 400. One kind of the information is location information for specifying a location of the printing apparatus 200. The other kind of the information is capability information of the printing apparatus 200 with respect to services to be provided by the printing apparatus 200. The location information and the capability information will be described below in detail with reference to FIG. 7 and FIG. 8.

Figure 6B:
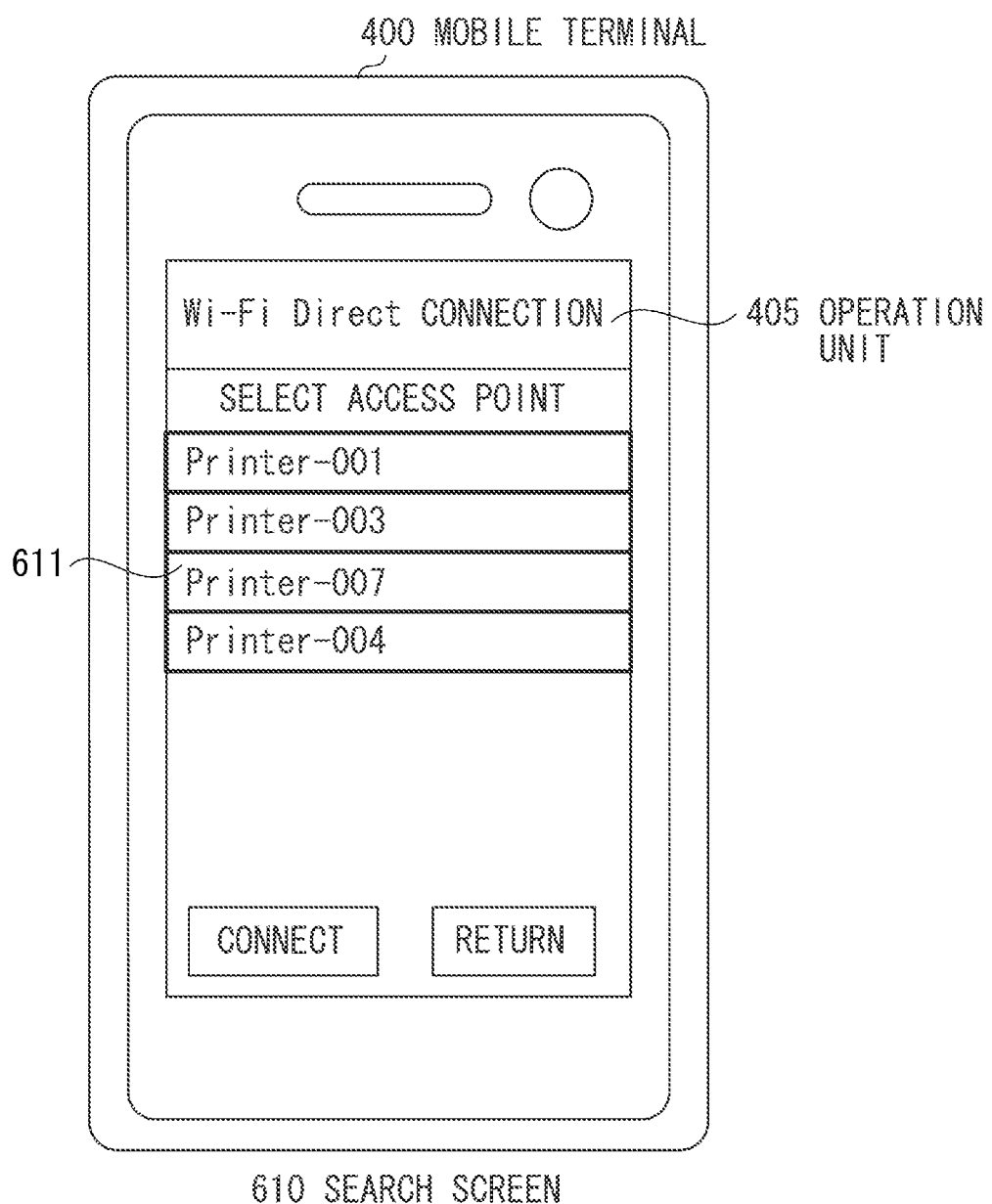

In step S506, the mobile terminal 400, which has received the response to the device information acquisition request from the printing apparatus 200, displays search results. FIG. 6B is a diagram illustrating a search screen 610 displayed on the operation unit 405 of the mobile terminal 400. The search screen 610 represents a list of communication apparatuses that can provide the user-specified service. In the search screen 610, an area 611 represents the list using device names of the respective communication apparatuses.

Figure 6C:
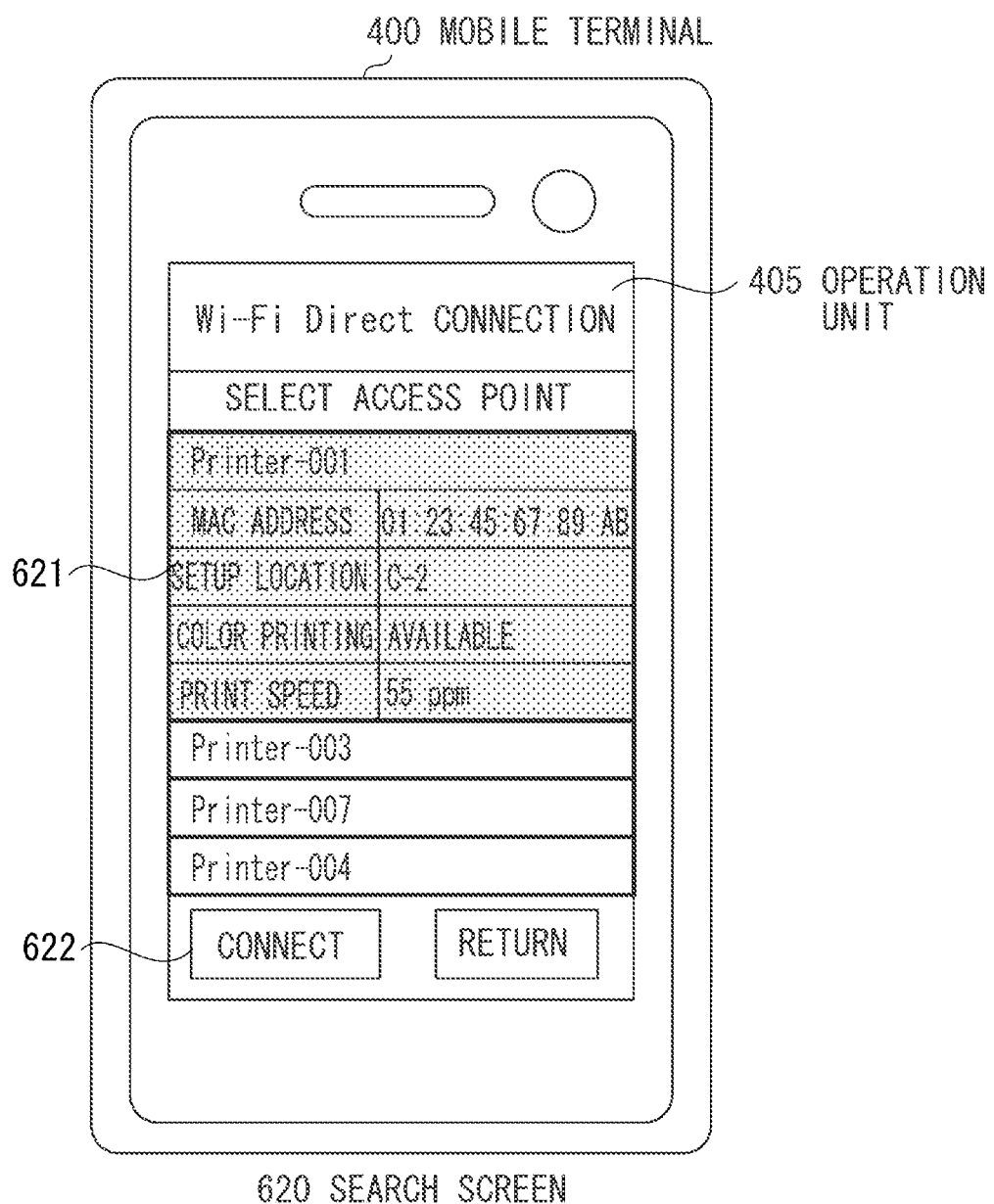

Subsequently, in step S507, the user selects a communication apparatus as a connection destination. When the user selects a desired communication apparatus from the list in the area 611, the operation unit 405 of the mobile terminal 400 displays a search screen 620 of FIG. 6C. The search screen 620 represents a case where the user selects a communication apparatus (printing apparatus 200) named "Printer-001" in the area 611. An area 621 of the search screen 620 highlights the user-selected communication apparatus named "Printer-001". In response to the selection of the user in the area 611, the area 621 displays the capability information and the location information of the communication apparatus named "Printer-001".

Like the search screen 620, if the user presses a button 622 while selecting the destination communication apparatus, in step S508, the mobile terminal 400 performs wireless connection to the printing apparatus 200 based on Wi-Fi Direct, thereby establishing a wireless communication between the mobile terminal 400 and the printing apparatus 200.

When establishing the wireless communication, the mobile terminal 400 employs the established wireless communication to utilize a service provided by the printing apparatus 200. For example, in step S509, the mobile terminal 400 can transmit print data to the printing apparatus 200 and utilize the print service that allows the printing apparatus 200 to perform printing based on the print data. The mobile terminal 400 can not only use the print service but also use the storage service in which the mobile terminal 400 transmits an electronic file such as image data to the printing apparatus 200, and then the printing apparatus 200 accumulates the received electronic file in a memory such as the HDD 205.

FIG. 7 is a diagram illustrating a registration screen 700 displayed on the operation panel 211 of the printing apparatus 200. The registration screen 700 can allow the user to register in the printing apparatus 200 various kinds of information including the location information of the printing apparatus 200.

The user inputs the device name of the printing apparatus 200 in an entry form 701. By entering any device name by the user, the user is now allowed to easily identify the printing apparatus 200 from other printing apparatuses. The user also inputs a setup location of the printing apparatus 200 in an entry form 702. Specifically, in the registration screen 700, the user inputs "C-2" as the setup location of the printing apparatus 200. The user may also input any designation of the setup location, such as the number of a room or the number of a conference room, in the entry form 702.

The user enters a latitude and a longitude as information indicating the setup location of the printing apparatus 200 in an entry form 703. In the above description, the registration screen 700 is configured so that the user enters the latitude and the longitude. Alternatively, in the case that the printing apparatus 200 has a GPS function, the latitude and the longitude may be automatically entered in the registration screen 700.

When the user presses a button 704, the memory such as the HDD 205 of the printing apparatus 200 stores the user input information in the registration screen 700.

FIG. 8 is a diagram illustrating device information 800 stored in the memory such as the HDD 205 of the printing apparatus 200. The device information 800 includes basic information 801 and capability information 802.

The basic information 801 includes a device name, a MAC address, and location information. The device name is information representing the device name input from the entry form 701 of the registration screen 700. The MAC address is a MAC address of the printing apparatus 200. The location information includes information representing the setup location input from the entry form 702 and both the latitude and the longitude input from the entry form 703.

The capability information 802 is information representing the capabilities of the printing apparatus 200 with respect to services provided by the printing apparatus 200. In the present exemplary embodiment, the printing apparatus 200 can provide a print service and a storage service. Thus, the printing apparatus 200 stores capability information corresponding to each of the print service and the storage service. For the print service, for example, the printing apparatus 200 stores information about print speed and the availability of color printing as capability information about the print service. For the storage service, the printing apparatus 200 stores information about the maximum capacity and free capacity of the storage area as capability information about the storage service.

The device information 800 stored in the printing apparatus 200 has been described with reference to FIG. 8. The PC 500 also has device information similar to the device information 800. Note that the device information of the PC 500 does not include capability information about print service because the PC 500 does not provide any print service.

A process for wireless connection performed by the mobile terminal 400 will be described with reference to the flowchart illustrated in FIG. 9. The CPU 401 develops a program stored in the memory such as the ROM 403 into the RAM 402 and executes the program to perform the respective steps illustrated in the flowchart of FIG. 9.

First, a user specifies (selects) a service of interest from a plurality of services by using the search screen 600 illustrated in FIG. 6A. In step S901, when the user presses the button 602, the wireless LAN I/F 406 transmits a service search for searching a communication apparatus capable of providing the user-specified service. The service search can be transmitted in multicast or broadcast. The service search transmitted in step S901 includes information for specifying the user-specified service in the searching screen 600.

In the next step S902, the CPU 401 determines whether a response to the service search transmitted in step S901 is received. In the present exemplary embodiment, after sending the service search in step S901, the CPU 401 waits for a response to the service search until a predetermined waiting time passes. In step S902, if the mobile terminal 400 has received a response to the service search from one or more communication apparatuses (for example, the printing apparatus 200) until the predetermined waiting time passes, the CPU 401 determines that the responses is received in step S902. Then, the process proceeds to step S903. On the other hand, if any response to the service search is not received until the predetermined waiting time passes, the CPU 401 determines that no response is received in step S902. Then, the CPU 401 terminates the process illustrated in FIG. 9. In the present exemplary embodiment, the response to the service search transmitted from the communication apparatus includes at least the MAC address of the communication apparatus. Information other than the MAC address, for example location information and capability information, can be obtained by processing in step S903. Thus, the response to the service search may not include the information other than the MAC address.

In step S903, the wireless LAN I/F 406 requires the device information of the communication apparatus that has responded to the service search. Specifically, the wireless LAN I/F 406 transmits an acquisition request for acquiring device information to the communication apparatus that has responded to the service search. The wireless LAN I/F 406 uses the MAC address of the communication apparatus to transmit the acquisition request in unicast. The acquisition request includes information for identifying a service specified by the user in the search screen 600.

In the next step S904, the CPU 401 determines whether a response to the acquisition request for device information transmitted in step S903 is received. In the present exemplary embodiment, after sending the acquisition request for device information in step S903, the CPU 401 waits for a response to the acquisition request for device information until a predetermined waiting time passes. In step S904, if the mobile terminal 400 has received a response to the acquisition request for device information from one or more communication apparatuses (for example, the printing apparatus 200) until the predetermined waiting time passes, the CPU 401 determines that the responses is received in step S904. Then, the process proceeds to step S905. On the other hand, if any response to the acquisition request for device information is not received until the predetermined waiting time passes, the CPU 401 determines that no response is received in step S904. Then, the CPU 401 terminates the process illustrated in FIG. 9.

In the present exemplary embodiment, a response of the communication apparatus to an acquisition request for device information includes the device information 800 illustrated in FIG. 8. Alternatively, however, the response may not include all of the information illustrated in FIG. 8. For the capability information 802, for example, the response may only include capability information about the user-specified service.

In step S905, the operation unit 405 of the mobile terminal 400 displays the results of the service search. For example, the displayed search results are listed on the search screen 610 illustrated in FIG. 6B. The search screen 610 displays four communication apparatuses as the search results of the service search. In other words, the search screen 610 represents that four communication apparatuses have responded to the acquisition request for device information transmitted from the mobile terminal 400 in step S903.

The communication apparatuses displayed on the area 611 of the search screen 610 are sorted in the order of their setup locations being close to the mobile terminal 400 based on the location information of the mobile terminal 400 identified by the GPS receiving unit 407, and the location information of the communication apparatuses included in their responses to the acquisition request for device information. From the user's view point, if there is a plurality of communication apparatuses capable of providing a desired service, the user may preferably select one located close to the user as a wireless communication access point. Representation of the setup locations in the order of being close to the mobile terminal 400 as in the case of the area 611 allows the user to easily select a communication apparatus located close to the user as an access point from communication apparatuses capable of providing a desired service.

Some types of the mobile terminal may not include any GPS receiving unit. In this case, the mobile terminal cannot identify its own location. Thus, the area 611 of the search screen 610 may display communication apparatuses in the order of receiving their responses or in the order of capability information, for example, in the order of print speed (the fastest first, the slowest last).

In step S906, the CPU 401 determines whether the user has selected a communication apparatus as a wireless communication access point. When the user selects the communication apparatus as a wireless communication access point (in the present exemplary embodiment, by pressing the button 622), the CPU 401 determines that the user has selected the communication apparatus as a wireless communication access point. Then, the process proceeds to step S907. On the other hand, when the user has not selected the communication apparatus as a wireless communication access point, the CPU 401 waits until the user selects the communication apparatus.

In step S907, the CPU 401 determines the user-selected communication apparatus as a wireless communication access point. For example, if the user selects a communication apparatus with a device name of "Printer-001" in the search screen 610 or the search screen 620, in step S907, the CPU 401 determines the communication apparatus with a device name of "Printer-001" as a wireless communication access point. Here, the following description will be given of a case where the processing in step S907 determines the printing apparatus 200 as a wires communication access point.

In step S908, the wireless LAN I/F 406 performs wireless connection to wirelessly communicate with the printing apparatus 200 determined as an access point. Note that the process for wireless connection will be described below in detail with reference to FIG. 10. Thus, the wireless connection in step S908 establishes a wireless communication between the mobile terminal 400 and the printing apparatus 200. The wireless communication allows the mobile terminal 400 to utilize services (print service and storage service) provided by the printing apparatus 200.

Figure 9:
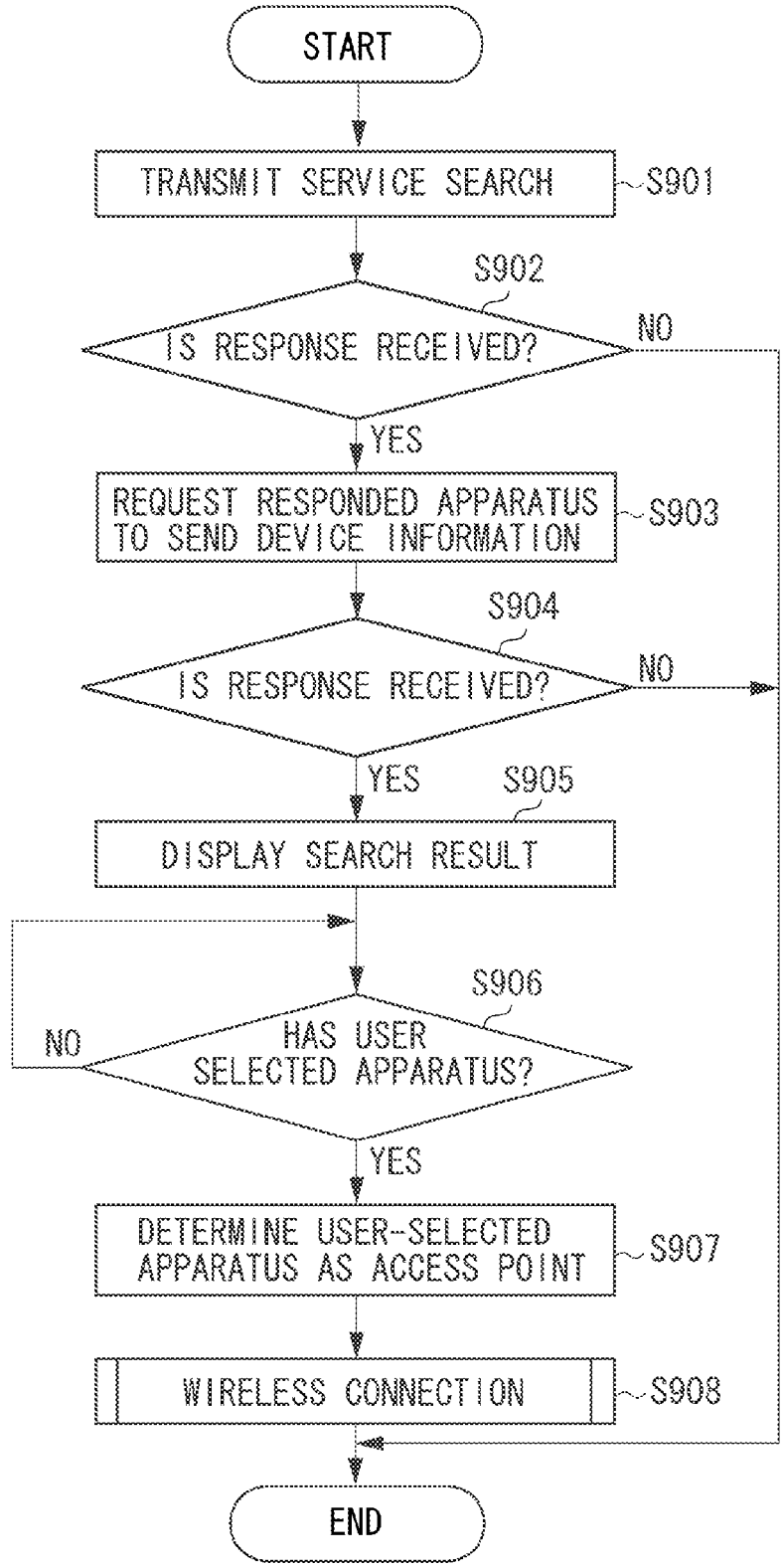
FIG. 9 is a diagram illustrating a flowchart illustrating processing executed by the mobile terminal.

In step S901 of the flowchart illustrated in FIG. 9, first, the mobile terminal 400 transmits the service search to the communication apparatuses in multicast or broadcast. In step S903, the mobile terminal 400 transmits an acquisition request for device information in unicast to a communication apparatus which has made a response to the service search that a service can be provided. Thus, the user can be prevented from obtaining device information from any communication apparatus that cannot provide a user-specified service. Accordingly, processing load on the mobile terminal 400 can be reduced.

In steps S902 and S904, as described above, the process illustrated in FIG. 9 is terminated when there is no response. Alternatively, when there is no response in these steps, the service search may be repeated several times. Furthermore, the user may be notified of no response and asked whether the service search should be repeated.

Figure 10:
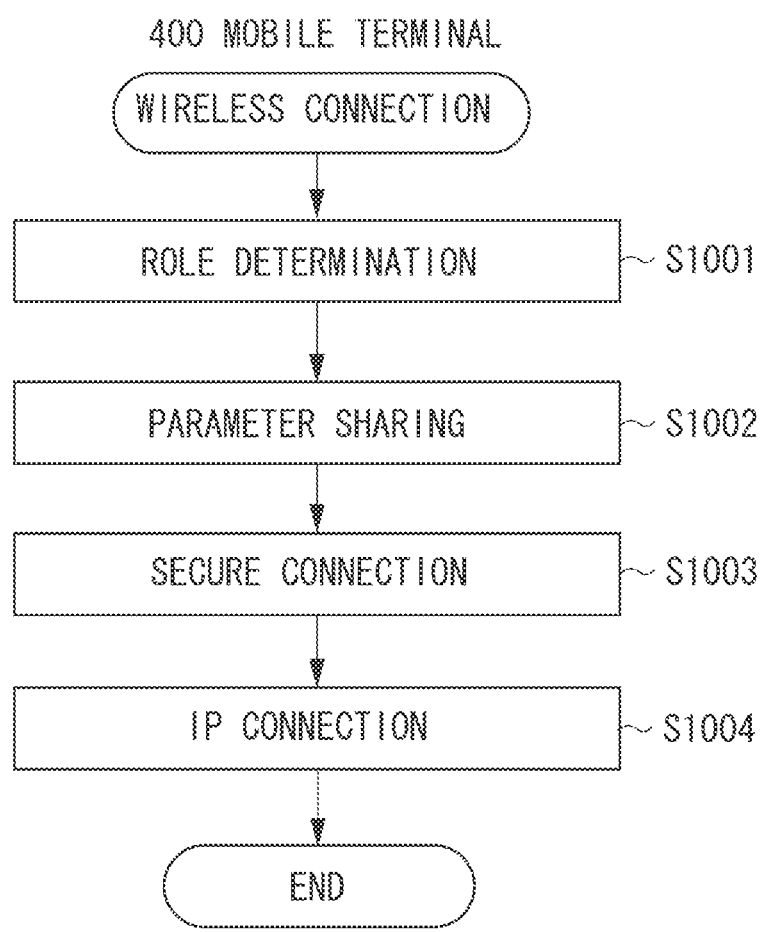
FIG. 10 is a diagram illustrating a flowchart illustrating processing executed by the mobile terminal.

The process for wireless connection illustrated in step S908 of FIG. 9 will be described with respect to the flowchart of FIG. 10. The CPU 401 develops a program stored in the memory such as the ROM 403 into the RAM 402 and executes the program to perform the respective steps illustrated in the flowchart of FIG. 10. Here, the following description will be given of a case where the processing in step S907 of FIG. 9 determines the printing apparatus 200 as a wireless communication access point.

In step S1001, first, the wireless LAN I/F 406 determines that which one of the mobile terminal 400 and the printing apparatus 200 serves as an access point (GroupOwner) and which one of them serves as a client (Client). This process is called role determination.

Next, in step S1002, the wireless LAN I/F 406 shares parameters with the printing apparatus 200 using Wi-Fi Protected Setup (WPS). The processing in step S1002 allows the mobile terminal 400 and the printing apparatus 200 to share parameters with each other.

In step S1003, the wireless LAN I/F 406 performs secure connection using the parameters shared in step S1002. Until the processing in step S1003 is completed, they communicate with each other as a data-link layer communication of the OSI reference model.

In step S1004, the wireless LAN I/F 406 performs IP connection with the printing apparatus 200 determined as an access point. In step S1004, addressing is performed for performing the IP communication between the mobile terminal 400 and the printing apparatus 200. In this case, the GroupOwner device provides an IP address for the Client device. The processing in step S1004 allows the mobile terminal 400 and the printing apparatus 200 to perform communication with each other in a communication layer higher than the network layer of the OSI reference model. Performing the processing illustrated in FIG. 10 establishes a wireless communication between the mobile terminal 400 and the printing apparatus 200.

A flowchart of FIG. 11 is used to describe a process performed by the printing apparatus 200 that has received the service search transmitted in step S901 or the acquisition request for device information transmitted in step S903 illustrated in FIG. 9. The CPU 202 develops a program stored in the memory such as the ROM 204 into the RAM 203 and executes the program to perform the respective steps illustrated in the flowchart of FIG. 11.

The flowchart of FIG. 11 is a process performed when the printing apparatus 200 receives a certain request. In step S1101, first, the CPU 202 determines whether the service search is received. If the CPU 202 determines that the service search is received, the process proceeds to step S1102. On the other hand, if the CPU 202 determines that the received request is not the service search, the process proceeds to step S1104.

Next, step S1102 will be described. In step S1102, the CPU 202 determines whether a service represented by the received service search is a service supported by the printing apparatus 200. If the service represented by the service search cannot be provided, in step S1102, the CPU 202 determines that the service is not a service supported by the printing apparatus 200, and then terminates the process illustrated in the flowchart of FIG. 11. In this case, the printing apparatus 200 does not make a response to the received service search. On the other hand, if the printing apparatus 200 can provide the service represented by the service search, in step S1102, the CPU 202 determines that the service is a service supported by the printing apparatus 200. Then, the process proceeds to step S1103. In step S1103, the wireless LAN I/F 212 makes a response to the received service search. The response includes at least the MAC address of the printing apparatus 200.

Now, step S1104 will be described. In step S1104, the CPU 202 determines whether the acquisition request for device information is received. If the CPU 202 determines that the acquisition request for device information is received, the process proceeds to step S1105. On the other hand, if the CPU 202 determines that the received request is not the acquisition request for device information, the process proceeds to step S1106.

Then, in step S1105, the wireless LAN I/F 212 transmits the device information to the printing apparatus 200. The device information includes at least the location information and the capability information of the printing apparatus 200.

Step S1106 will be described. In step S1106, the CPU 202 determines whether the request for wireless connection is received. If the CPU 202 determines that the request for wireless connection is received, the process proceeds to step S1107. On the other hand, if the CPU 202 determines that the received request is not the request for wireless connection, the process proceeds to step S1108.

In step S1107, the wireless LAN I/F 212 performs wireless connection with the mobile terminal 400. The description of this process is omitted because of its similarity to the process for wireless connection of the mobile terminal 400 illustrated in FIG. 10.

Step S1108 will be described. In step S1108, the CPU 202 processes based on the received data. For example, if the print service 306 receives print data, the printer 207 performs printing based on the received print data. Furthermore, for example, if the storage service 307 receives an electronic file, the CPU 202 stores the received electronic file in the memory such as the HDD 205.

According to the present exemplary embodiment, as described above, the mobile terminal 400 searches a communication apparatus after specifying a service the user wants to use. Thus, the mobile terminal 400 can establish a Wi-Fi Direct wireless communication with a communication apparatus capable of providing a desired service.

When the mobile terminal 400 includes a GPS function, a list of search results is represented by sorting communication apparatuses in the order of being close to the mobile terminal 400. From the user's view point, the user may preferably select one located close to the user as a wireless communication access point from communication apparatuses capable of providing a desired service.

In the above first exemplary embodiment, the communication apparatus (printing apparatus 200) that has received the service search does not respond to the service search when the apparatus cannot provide the specified service. Alternatively, however, the apparatus may reply that the apparatus cannot provide the specified service (or does not support the specified service). In step S903, the mobile terminal 400 transmits the acquisition request for device information in unicast to the communication apparatus which has replied that the specified service can be provided. On the other hand, the mobile terminal 400 does not transmit the acquisition request for device information to the communication apparatus which has replied that the specified service cannot be provided. Thus, the user can be prevented from obtaining device information from any communication apparatus that cannot provide a user-specified service. Accordingly, processing load on the mobile terminal 400 can be reduced.

The above exemplary embodiments have been described such that the printing apparatus 200 and the mobile terminal 400 performs Wi-Fi Direct as a wireless communication. Alternatively, however, the wireless communication is not limited to Wi-Fi Direct. The above exemplary embodiments can be applied to any wireless communication as long as a plurality of communication apparatuses can directly communicate with each other like Wi-Fi Direct.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, a communication apparatus is capable of searching an apparatus that can provide a desired service and establishing a wireless communication with the searched apparatus.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-033425 filed Feb. 22, 2013, which is hereby incorporated by reference herein in its entirety.

What is claimed is:

1. A communication apparatus having a Wi-Fi Direct function, the communication apparatus comprising:
 a memory that stores instructions; and
 a processor that executes the instructions to:
 specify a service desired by a user from among a plurality of services including at least a print service;
 transmit, in a case where an instruction for starting a search is accepted from the user, a service search for searching for a device that has the Wi-Fi Direct function and provides the specified service, to a plurality of nearby devices;
 transmit, to a device that has responded to the service search, an acquisition request for acquiring device information, wherein a device that does not provide the specified service does not respond to the service search;
 display, based on device information acquired in response to the acquisition request, a candidate list for a user to select a connection destination of the Wi-Fi Direct function, wherein devices that provide the specified service are displayed in the candidate list and devices that do not provide the specified service are not displayed in the candidate list; and
 perform a connection process for establishing wireless connection of the Wi-Fi Direct function between the communication apparatus and a device selected from the candidate list by the user.

2. The communication apparatus according to claim 1, wherein the device information includes location information indicating a location of the device, and wherein the location of the device is displayed in the candidate list.

3. The communication apparatus according to claim 1,
 wherein the device information includes location information indicating a location of the device, and
 wherein the processor executes a further instruction stored in the memory to:

display, based on the location information, the candidate list in which a plurality of devices is displayed in ascending order of distance to the communication apparatus.

4. The communication apparatus according to claim 1, wherein the device information includes capability information indicating a capability of the specified service, and
wherein the capability of the specified service is displayed in the candidate list.

5. The communication apparatus according to claim 1, wherein the device information includes name information indicating a name of the device, and
wherein the name of the device is displayed in the candidate list.

6. The communication apparatus according to claim 1, wherein the communication apparatus is a mobile terminal.

7. The communication apparatus according to claim 1, wherein the service search is transmitted in broadcast.

8. A method for controlling a communication apparatus capable of performing direct wireless communication, the method comprising:
    specifying, at a computing device, a service desired by a user from among a plurality of services including at least a print service;
    transmitting in a case where an instruction for starting a search is accepted from the user, a service search for searching for a device that has the Wi-Fi Direct function and provides the specified service, to a plurality of nearby devices;
    transmitting, to a device that has responded to the service search, an acquisition request for acquiring device information, wherein a device that does not provide the specified service does not respond to the service search;
    displaying, based on device information acquired in response to the acquisition request, a candidate list for a user to select a connection destination of the Wi-Fi Direct function, wherein devices that provide the specified service are displayed in the candidate list and devices that do not provide the specified service are not displayed in the candidate list; and
    performing a connection process for establishing wireless connection of the Wi-Fi Direct function between the communication apparatus and a device selected from the candidate list by the user.

9. A non-transitory computer-readable storage medium configured to store computer executable instructions for a computer to execute a process for controlling a communication apparatus capable of performing direct wireless communication, the process comprising:
    specifying a service desired by a user from among a plurality of services including at least a print service;
    transmitting in a case where an instruction for starting a search is accepted from the user, a service search for searching for a device that has the Wi-Fi Direct function and provides the specified service, to a plurality of nearby devices;
    transmitting, to a device that has responded to the service search, an acquisition request for acquiring device information, wherein a device that does not provide the specified service does not respond to the service search;
    displaying, based on device information acquired in response to the acquisition request, a candidate list for a user to select a connection destination of the Wi-Fi Direct function, wherein devices that provide the specified service are displayed in the candidate list and devices that do not provide the specified service are not displayed in the candidate list; and
    performing a connection process for establishing wireless connection of the Wi-Fi Direct function between the communication apparatus and a device selected from the candidate list by the user.

* * * * *